(12) United States Patent
Kim

(10) Patent No.: US 10,353,970 B2
(45) Date of Patent: Jul. 16, 2019

(54) PREVIOUSLY-BROWSED INFORMATION ADAPTIVE FILTER UNIT FOR IMPROVEMENT IN FUNCTIONING OF A COMPUTER

(71) Applicant: Christine Hana Kim, San Jose, CA (US)

(72) Inventor: Christine Hana Kim, San Jose, CA (US)

( * ) Notice: Subject to any disclaimer, the term of this patent is extended or adjusted under 35 U.S.C. 154(b) by 547 days.

(21) Appl. No.: 15/081,861

(22) Filed: Mar. 26, 2016

(65) Prior Publication Data
US 2017/0277796 A1  Sep. 28, 2017

(51) Int. Cl.
| G06F 17/30 | (2006.01) |
| G06F 16/9535 | (2019.01) |
| G06F 16/958 | (2019.01) |

(52) U.S. Cl.
CPC ........ *G06F 16/9535* (2019.01); *G06F 16/958* (2019.01)

(58) Field of Classification Search
CPC ........... G06F 17/30867; G06F 16/9535; G06F 16/958
USPC ....................................................... 707/754
See application file for complete search history.

(56) References Cited

U.S. PATENT DOCUMENTS

| 5,918,014 | A | * | 6/1999 | Robinson | ............... G06Q 30/02 706/12 |
| 2005/0033657 | A1 | * | 2/2005 | Herrington | ....... G06F 17/30058 705/26.7 |
| 2009/0171930 | A1 | * | 7/2009 | Vaughan | ........... G06F 17/30876 |
| 2013/0290106 | A1 | * | 10/2013 | Bradley | ................ G06Q 90/20 705/14.64 |
| 2014/0122220 | A1 | * | 5/2014 | Bradley | ............. G06Q 30/0267 705/14.42 |

* cited by examiner

*Primary Examiner* — Joshua Bullock
(74) *Attorney, Agent, or Firm* — Invent Capture, LLC.; Samuel S. Cho

(57) ABSTRACT

A previously-browsed information adaptive filter unit and a method of operating the adaptive filter unit are disclosed. In one embodiment, the previously-browsed information adaptive filter unit can be integrated into a web browser as a factory-spec filter, as an aftermarket application software, or as a semiconductor chip. The previously-browsed information adaptive filter unit is capable of identifying, queuing, replacing, and/or substituting a user's previously-browsed information from a website with a fresh content, which the user has not yet interacted with from the website. The previously-browsed information adaptive filter unit may be integrated into a desktop or laptop web browser, or into a handheld mobile web browser. The previously-browsed information adaptive filter unit significantly improves the functioning of a computerized electronic device by minimizing redundant information transmission between the computerized electronic device and a web host server, and by prioritizing fresher information in a limited display screen size for efficient communication.

14 Claims, 8 Drawing Sheets

A Previously-Browsed Information Adaptive Filter Unit for a Web Browser Interface, with the Adaptive Filter Unit in a Disabled Mode A Previously-Browsed Information Adaptive Filter Unit for a Web Browser Interface, with the Adaptive Filter Unit in a Disabled Mode

400

A Previously-Browsed Information Adaptive Filter Unit for a Mobile Web Browser Interface, with the Adaptive Filter Unit in an Enabled Mode with a Preset Time Limit A Settings Menu for the Previously-Browsed Information Adaptive Filter Unit Incorporated into a Web Browser An Embodiment of Logical Units in the Previously-Browsed Information Adaptive Filter Unit An Example of a Computerized Electronic Device Incorporating a Previously-Browsed Information Adaptive Filter Unit

PREVIOUSLY-BROWSED INFORMATION ADAPTIVE FILTER UNIT FOR IMPROVEMENT IN FUNCTIONING OF A COMPUTER

BACKGROUND OF THE INVENTION

The present invention generally relates to an electronic information filtering unit for improvement in functioning of a computerized electronic device. More specifically, the present invention relates to a previously-browsed information adaptive filter unit that integrates or plugs into a web browser for improvement in functioning of a computerized electronic device.

Many Internet and other data network users today utilize web browsers, which are executed on their computerized electronic devices. A desktop or laptop computer user, for example, may search for and download electronic information by interacting with a computer web browser, such as Microsoft's Internet Explorer or Google's Chrome. Typically, a computer web browser is configured to fetch and download electronic information from a website's host server, and then display the downloaded electronic information as a webpage on the computer web browser. A user is then able to interact with the downloaded electronic information on the webpage via embedded hyperlinks and clickable items.

Furthermore, in recent years, browsing an Internet webpage on a mobile device's web browser has also become a daily routine for many mobile device users. A mobile device, such as a smart phone, a tablet computer, or another type of handheld computer, typically incorporates a touch-sensitive display screen for receiving and invoking a user action to embedded hyperlinks or items displayed on the mobile device's web browser.

In some instances, a redundant display of electronic information that has already been viewed, clicked, and/or utilized by the user on a particular web page reduces the amount of "fresh" information that can be displayed on the particular web page. As the consumer utilization of the Internet increasingly moves towards smaller-screen displays on mobile devices, a screen real estate utilization for information display on a mobile web page is increasingly becoming critical for both Internet browsing convenience and Internet advertiser effectiveness.

For example, a mobile device user may not want to scroll a webpage up and down on a mobile display just to browse through already-reviewed or already-interacted information from a content-providing website. Instead, at least in some instances, the mobile device user may prefer viewing only new articles, contents, and hyperlinks, especially considering the small screen size of the mobile display. In a mobile computing environment, the mere presence of the already-reviewed or already-interacted information displayed on the mobile device could become a source of inconvenience, clutter, and distraction, as the precious screen real estate is allotted to displaying already-reviewed or already-interacted information, instead of fresh contents, which the user may prefer to see. Likewise, even in a desktop computing environment, the presence of the already-reviewed or already-interacted information displayed on a computer display panel during web browsing may be considered unnecessary and cluttering to a computer user.

Furthermore, from an Internet advertiser's perspective, a merely-repeated display of already-reviewed or already-interacted information via a website may reduce an advertising space on a display screen, especially in case of a mobile device advertising application with a limited display screen space. Moreover, redundant or repeated contents that no longer attract attention from a website user reduce effectiveness of online advertising, while also hampering advertisers' opportunities to provide diversified or customized advertising materials that correlate to fresher contents provided by the website.

Therefore, a novel electronic information filtering unit that can be plugged in or integrated into a web browser to improve functioning of a computerized electronic device for user convenience and online advertising effectiveness may be highly desirable. Furthermore, a novel electronic information filtering unit that can identify, determine, and replace a user's already-reviewed or already-interacted information with fresher contents may be highly desirable.

In addition, a novel electronic information filtering unit that can uniquely infuse fresher contents to an existing webpage to replace a user's already-reviewed or already-interacted information only, while keeping "not-yet-reviewed" or "not-yet-interacted" information intact in the existing webpage, may also be highly desirable in some situations.

Moreover, a user settings menu interface that plugs into or integrates with a web browser to control a previously-browsed information filter on/off mode and a filter duration timer may also be highly desirable for user convenience and online advertising effectiveness.

Furthermore, a method of operating a previously-browsed information adaptive filter unit for improvement in functioning of a computerized electronic device may also be highly desirable.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a previously-browsed information adaptive filter unit for an improvement in functioning of a computerized electronic device with a web browser is disclosed. This previously-browsed information adaptive filter unit comprises: an adaptive filter control and timer logic block comprising a filter timer unit and a filter enable and disable control unit; an adaptive filtering and content substitution logic block comprising an already-viewed links and contents deletion unit, a replacement hyperlink and content generation unit, and a webpage synthesis unit, wherein the adaptive filtering and content substitution logic block is operatively connected to a website's computer server that provides electronic contents to the web browser of the computerized electronic device via a data network; and an adaptive filter's updatable database comprising a list of user-visited websites, a list of hyperlinks clicked, pressed, or invoked by a user accessing the website, and a list of time elapsed since clicking, pressing, or invoking of each hyperlink by the user accessing the website through the computerized electronic device connected to the website's computer server, wherein the adaptive filter's updatable database is also operatively connected to the website's computer server to dynamically track and update the list of user-visited websites and the list of hyperlinks clicked, pressed, or invoked by the user accessing the website.

In another embodiment of the invention, a method for operating a previously-browsed information adaptive filter unit for improvement in functioning of a computerized electronic device is disclosed. This method comprises the steps of: receiving a batch of electronic information to be displayed on a web browser of a computerized electronic device from a website's computer server; identifying previously-accessed or previously-reviewed information by a user from the batch of electronic information; and checking whether the previously-browsed information adaptive filter is currently in an enable mode.

Furthermore, in this method, if the previously-browsed information adaptive filter is in the enable mode, the method includes additional steps of: initiating a filter timer, which is controlled and managed by a settings menu integrated into the web browser; requesting different electronic information from the website's computer server; replacing the previously-accessed or previously-reviewed information with the different electronic information; synthesizing a uniquely-infused webpage that includes the different electronic information and a non-accessed and non-reviewed portion of the batch of electronic information; and displaying the uniquely-infused webpage from the web browser.

Otherwise, in this method, if the previously-browsed information adaptive filter is in a disable mode, the method includes additional steps of: transferring all of the batch of electronic information to the web browser for unfiltered display; and displaying an unfiltered webpage from the web browser.

DETAILED DESCRIPTION

Figure 1:
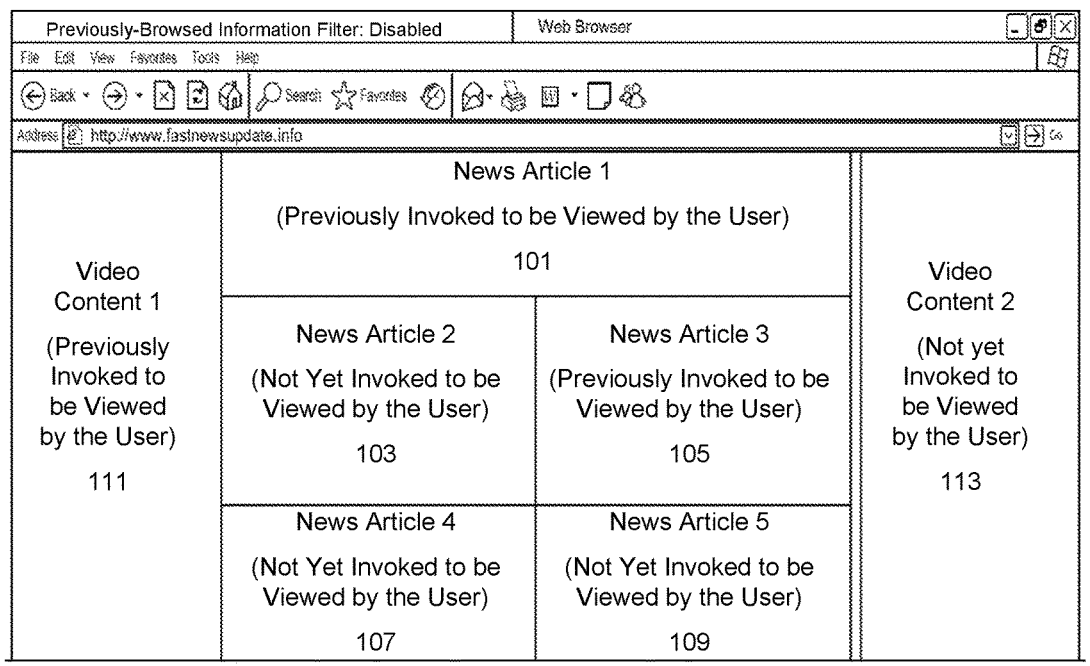
FIG. 1 shows a screenshot of a previously-browsed information adaptive filter unit integrated into a computer web browser, with the adaptive filter unit in a disabled mode, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more apparatuses and methods for filtering, replacing, and substituting previously-browsed information on a web browser of a computerized electronic device. These process descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention does not inherently indicate any particular order and do not imply any limitations in the invention.

One aspect of an embodiment of the present invention is to provide a previously-browsed information adaptive filter unit that can be plugged in or integrated into a web browser to improve functioning of a computerized electronic device.

Another aspect of an embodiment of the present invention is to provide a previously-browsed information adaptive filter unit that can identify, determine, and replace a user's already-reviewed or already-interacted information with fresher contents.

Yet another aspect of an embodiment of the present invention is to provide a previously-browsed information adaptive filter unit that can uniquely infuse fresher contents to an existing webpage to replace a user's already-reviewed or already-interacted information, while keeping "not-yet-reviewed" or "not-yet-interacted" information intact in the existing webpage.

Furthermore, an additional aspect of an embodiment of the present invention is to provide a user settings menu interface that plugs into or integrates with a web browser to control a previously-browsed information filter on/off mode and a filter duration timer.

Yet another aspect of an embodiment of the present invention is to provide a method of operating a previously-browsed information adaptive filter unit for improvement in functioning of a computerized electronic device.

For the purpose of describing the invention, a term, "previously-browsed information," is defined as electronically-displayed information that are previously seen, read, reviewed, and/or interacted information by a user of a computerized electronic device.

Similarly, for the purpose of describing the invention, a term, "user-accessed information," is defined as electronically-displayed information that are previously seen, read, reviewed, and/or interacted information by a user of a computerized electronic device.

Furthermore, for the purpose of describing the invention, a term, "previously-browsed information adaptive filter unit," is defined as an artificial intelligence-based information filtering apparatus that comprises an updatable database, an adaptive filter control and timer logic block, and an adaptive filtering and content substitute logic block, which are operatively connected to a user-visited website server and a user's web browser on an electronic device. In one embodiment, this artificial intelligence-based information filtering apparatus may be implemented as a software application that is configured to be plugged in or installed into a web browser software, a mobile device application software, or another interface operating on an electronic device, wherein each software and/or interface provides access to a computerized data network with other computers or computer servers. The software application may be resident in a data storage device and executed on a CPU and a memory unit of the electronic device. In another embodiment, the artificial intelligence-based information filtering apparatus may be implemented or hard-coded in a semiconductor chip (e.g. a non-volatile memory chip, a field programmable gate array (FPGA), an application-specific integrated circuit (ASIC), etc.) as binary codes or other machine codes.

In addition, for the purpose of describing the invention, a term, "computerized electronic device," is defined as an electrically-powered hardware device that provides access to a data network and electronic information to a user through a web browser, a mobile application, or another user interface associated with the electrically-powered hardware device. Examples of computerized electronic devices include, but are not limited to, a desktop computer, a notebook computer, a cellular phone, a tablet device with one or more touch screens, an electronic goggle, or another data-networked device with a display screen and a user interface.

FIG. 1 shows a screenshot (100) of a previously-browsed information adaptive filter unit integrated into a computer web browser, with the adaptive filter unit in a disabled mode, in accordance with an embodiment of the invention. As shown by the screenshot (100), in a preferred embodiment of the invention, the previously-browsed information adaptive filter unit is installed into the computer web browser as a factory-spec or user plug-in application. The computer web browser is typically configured to be executed in a CPU and a memory unit of a desktop computer, a laptop computer, a mobile device, or another computerized electronic device capable of communicating electronic information through a data network. The computer web browser may be a general-purpose web browser software (e.g. Microsoft Internet Explorer, Google Chrome, Firefox, etc.) or an application-specific web-connected software (e.g. a mobile app, a word processor software, an accounting software, an e-book software, etc.).

When the previously-browsed information adaptive filter unit is in the disabled mode, previously reviewed, accessed, and interacted information by a particular user of the computer web browser remains unfiltered. Therefore, as shown in the screenshot (100) of FIG. 1, textual or multimedia information that are previously-browsed (101, 105, 111), or not previously-browsed (103, 107, 109, 113), are both plainly displayed by the computer web browser. In one embodiment, the screenshot (100) is a snapshot of a webpage (e.g. "http://www.fastnewsupdate.info") visited by the user through the computer web browser. In another embodiment, the screenshot (100) may be a snapshot of a user interface of an application-specific software or an application-specific device, such as an e-book, a mobile app, an accounting software, an educational software, or a consumer appliance (e.g. an Internet-connected refrigerator, a smart television, an in-car navigation system, etc.).

Textual information displayed by the computer web browser may include, but are not limited to, news articles, hyperlinks to a webpage, text messages, and emails. Multimedia information displayed by the computer web browser may include, but are not limited to, videos, podcasts, web broadcasts, audio broadcasts, or hyperlinks to such multimedia contents.

In context of the screenshot (100) of FIG. 1, "News Article 1" (101), "News Article 3" (105), and "Video Content 1" (111) have been previously invoked to be viewed by the user. On the other hand, "News Article 2" (103), "News Article 4" (107), "News Article 5" (109), and "Video Content 2" (113) have not been previously invoked to be viewed by the user.

Methods of invoking views by the user may include, but are not limited to, clicking or touching a graphics icon, a textual hyperlink, a section of a webpage, or an item on the webpage. Furthermore, other methods of invoking views by the user may include detecting the user's eye movement to a specific section of a webpage, or detecting the user's gesture associated with the specific section of the webpage. Detection of the user's eye movements or the user's gestures may be performed by a webcam or another visual sensor connected to the computerized electronic device that also executes a corresponding sensor processing and detection software.

Figure 2:
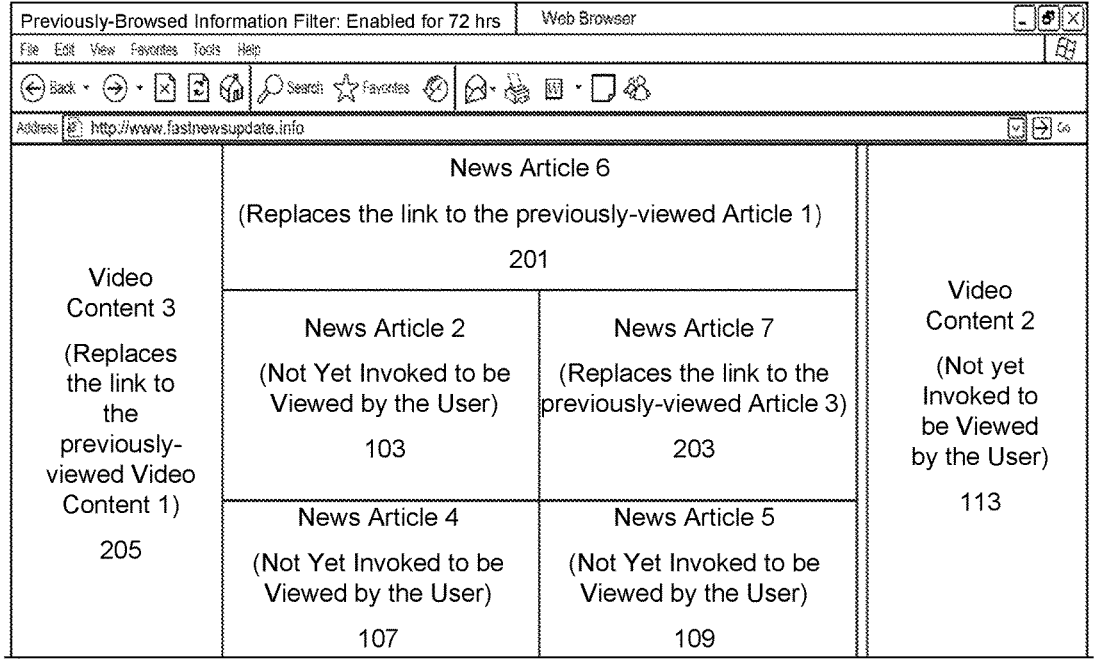
FIG. 2 shows a screenshot of a previously-browsed information adaptive filter unit integrated into a computer web browser, with the adaptive filter unit in an enabled mode with a preset time limit, in accordance with an embodiment of the invention.

FIG. 2 shows a screenshot (200) of a previously-browsed information adaptive filter unit integrated into a computer web browser, with the adaptive filter unit in an enabled mode with a preset time limit, in accordance with an embodiment of the invention. In the preferred embodiment of the invention, the previously-browsed information adaptive filter unit may be activated with the preset time limit, so that previously-browsed information filtering is only operational for the duration of the preset time limit. For example, in the screenshot (200) as shown in FIG. 2, the preset time limit is set for the next 72 hours. Upon expiration of the preset time limit, the previously-browsed information adaptive filter unit is automatically disabled to allow reception of regular or standard contents of a webpage provided to other web visitors, instead of filtering out and replacing previously user-browsed information from the webpage to synthesize an individualized and customized webpage view with "un-browsed" contents alone. Although the individualized and customized webpage view that only packages the "un-browsed" contents in the filter-enabled mode (i.e. as shown in FIG. 2) may improve user reading efficiencies and information display optimizations in a limited display screen size, the preset time limit ensures an automatic reversion to regular or standard contents of a webpage to prevent an inadvertently-persistent information presentation disparity to the user accessing a particular website, a mobile app, or a computerized user interface.

Figure 5:
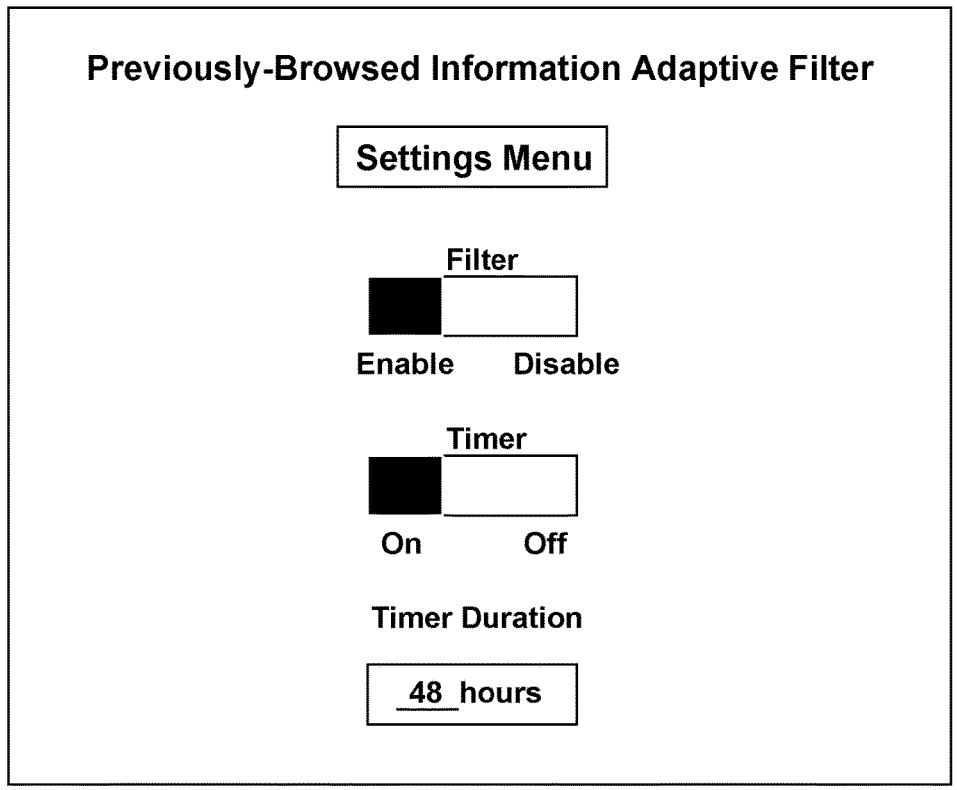
FIG. 5 shows a settings menu for a previously-browsed information adaptive filter unit, which is incorporated into a web browser, in accordance with an embodiment of the invention.

In the preferred embodiment of the invention, a user interface associated with the previously-browsed information adaptive filter unit allows the user to define or select the preset time limit, as exemplified by a settings menu (500) in FIG. 5. The preset time limit may range from a few minutes to a multiple number of hours, days, weeks, or months, depending on the user's preference for filtering out any previously-browsed information from the webpage, which is repeatedly visited by the user over a course of time.

Continuing with FIG. 2, when the previously-browsed information adaptive filter unit is in the enabled mode, previously reviewed, accessed, and interacted information by a particular user of the computer web browser is automatically removed from the webpage, and substituted by new or fresh contents that have not been previously browsed by the user through the web browser interface. The dynamic removal of previously-browsed information and substitution of new or fresh contents in specific areas of the webpage is shown in the screenshot (200) of FIG. 2. This dynamic content removal and content substitution process involves synthesizing a personalized custom webpage view that only includes fresh, new, or previously un-browsed contents by a particular user, who is recognized and tracked by the previously-browsed information adaptive filter unit.

When the previously-browsed information adaptive filter unit is in the enabled mode, previously-browsed information (e.g. 101, 105, 111 of FIG. 1) by a particular user is removed (i.e. filtered out) and is replaced or substituted by "user un-browsed" new contents that are freshly downloaded and synthesized into the personalized custom webpage view, as shown the screenshot (200) of FIG. 2. In this example, "News Article 6" (201), "News Article 7" (203), and "Video Content 3" (205) are "user un-browsed" new contents that are freshly downloaded from the website currently being visited by the particular user through the web browser interface. The "user un-browsed" new contents (e.g. 201, 203, 205 of FIG. 2) automatically replace and substitute for the previously-browsed information (e.g. 101, 105, 111 of FIG. 1) to synthesize the personalized custom webpage view, as shown by the screenshot (200) in FIG. 2, if the previously-browsed information adaptive filter unit is in the enabled mode.

Furthermore, as shown in the screenshot (200) of FIG. 2, previously or repeatedly-downloaded electronic information that have not been previously-browsed by the user (e.g. 103, 107, 109, 113 of FIG. 1 and FIG. 2) are not replaced in the personalized custom webpage view, and are instead packaged together with the "user un-browsed" new contents (e.g. 201, 203, 205 of FIG. 2) that automatically replaced and substituted for the previously-browsed information (e.g. 101, 105, 111 of FIG. 1), when the previously-browsed information adaptive filter unit is in the enabled mode.

In one embodiment, the screenshot (200) in FIG. 2 is a snapshot of a webpage (e.g. "http://www.fastnewsupdate.info") visited by the user through the computer web browser. In another embodiment, the screenshot (200) may be a snapshot of a user interface of an application-specific software or an application-specific device, such as an e-book, a mobile app, an accounting software, an educational software, or a consumer appliance (e.g. an Internet-connected refrigerator, a smart television, an in-car navigation system, etc.). Textual information displayed by the computer web browser may include, but are not limited to, news articles, hyperlinks to a webpage, text messages, and emails. Multimedia information displayed by the computer web browser may include, but are not limited to, videos, podcasts, web broadcasts, audio broadcasts, or hyperlinks to such multimedia contents.

In context of the screenshot (200) of FIG. 2, the unique synthesis of the personalized custom webpage view by infusing the "user un-browsed" new contents (e.g. 201, 203, 205 of FIG. 2) with the previously or repeatedly-downloaded electronic information that have not been previously-browsed by the user (e.g. 103, 107, 109, 113 of FIG. 1 and FIG. 2), in accordance with an embodiment of the invention, is a novel aspect of the invention that allows the user to read, review, inspect, or entertain only with fresh online contents in the web browser interface, when and if the user chooses to activate the previously-browsed information adaptive filter unit.

In certain circumstances, the novel feature of synthesizing and presenting only fresh and previously un-browsed electronic contents to the user provides significant advantages to the user and the web browser interface. For example, when the user desires to only read, review, or interact with fresh (i.e. previously uninspected) online contents, the previously-browsed information adaptive filtering, in accordance with one or more embodiments of the invention, provides substantial convenience and efficiencies to the user by alleviating an otherwise-necessary mental task of sorting and separating old information from new information. Furthermore, the previously-browsed information adaptive filtering also empowers the user with less screen clutter and more screen space to experience fresher or newer information in the personalized custom webpage view. In addition, activating the previously-browsed information adaptive filter unit can improve the display screen real estate utilization by presenting fresher or newer information only within the constraint of a limited display screen size and a limited display resolution.

Figure 3:
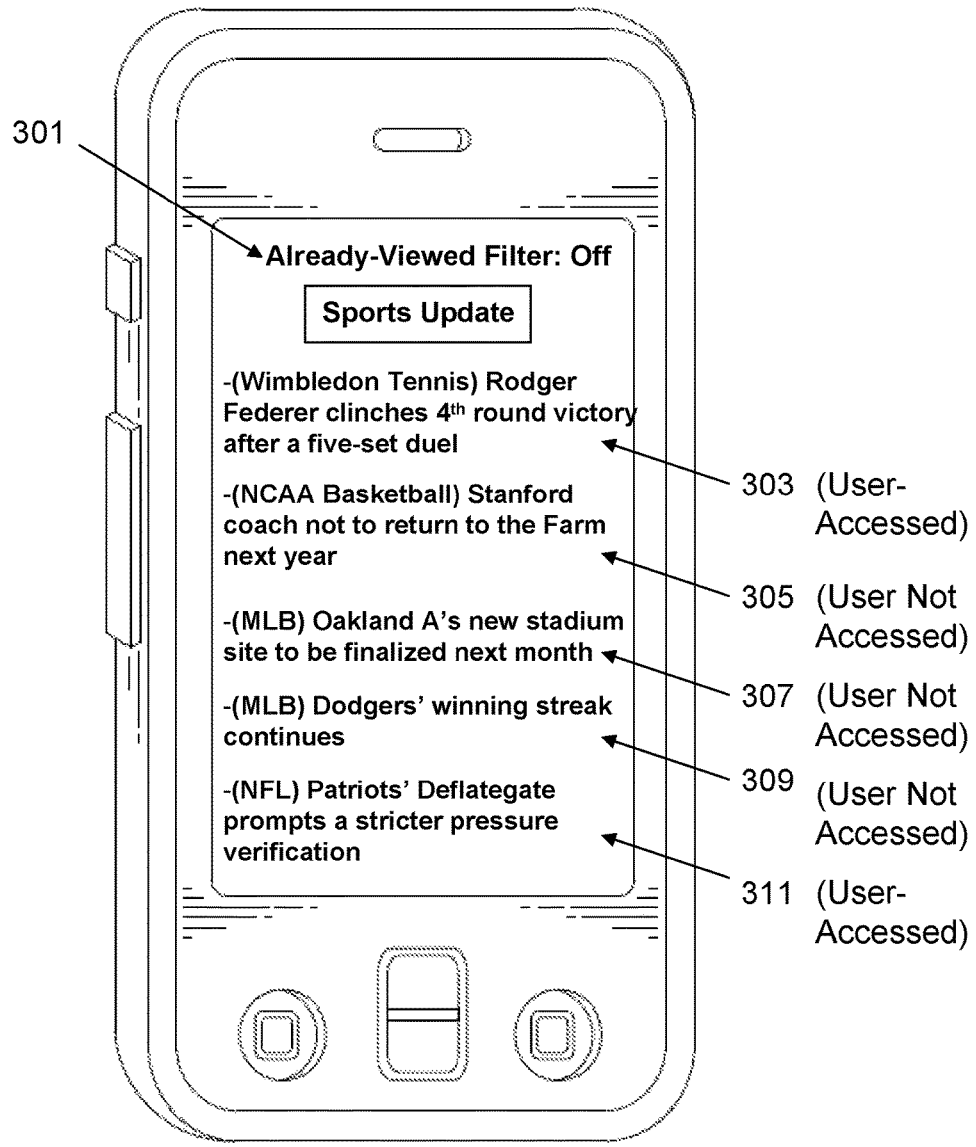
FIG. 3 shows a screenshot of a previously-browsed information adaptive filter unit integrated into a mobile device-based web browser or a mobile application, with the adaptive filter unit in a disabled mode, in accordance with an embodiment of the invention.

FIG. 3 shows a screenshot (300) of a previously-browsed information adaptive filter unit integrated into a mobile device-based web browser or a mobile application, with the adaptive filter unit in a disabled mode, in accordance with an embodiment of the invention. As shown by the screenshot (300), in this embodiment of the invention, the previously-browsed information adaptive filter unit is installed into the mobile device web browser or the mobile application as a preinstalled or user plug-in application. The mobile device web browser or the mobile application is typically configured to be executed in a CPU and a memory unit of a smart phone, a tablet computing device, or another portable electronic device.

When the previously-browsed information adaptive filter unit is in the disabled mode, previously reviewed, accessed, and interacted information by a particular user of the mobile device web browser or the mobile application remains unfiltered. In an example as shown in the screenshot (300) of FIG. 3, the previously-browsed information adaptive filter unit (i.e. shown as "already-viewed" filter (301) in FIG. 3) is in the disabled mode, and displays a standard listing of news article links, regardless of previous access or interaction by the user with each news article entry. Therefore, both previously-browsed news article links (303, 311) and previously un-browsed news article links (305, 307, 309) by a particular user are plainly displayed by the mobile web browser or the mobile application that downloads news articles from a news content provider.

In one embodiment, the screenshot (300) in FIG. 3 is a snapshot of a mobile application or a mobile web browser that streams recent sports news update from a sports news content provider's server. In the example as shown in FIG. 3, some sports news article links (i.e. 303, 311) have been already accessed, clicked, touched, or interacted with the user previously, while other sports news article links (i.e. 305, 307, 309) have not been accessed, clicked, touched, or interacted with the user previously. In other embodiments of the invention, information displayed by the mobile application or the mobile web browser may be one or more interactive contents or hyperlinks to webpages, text messages, emails, videos, podcasts, web broadcasts, or audio broadcasts.

Methods of determining "previous user access" by the previously-browsed information adaptive filter unit may include, but are not limited to, creating and maintaining a user-specific history of clicking or touching a graphics icon, a textual hyperlink, or a section of a displayed content. Furthermore, other methods of determining and tracking "previous user access" by the user may include detecting the user's eye movement to a specific section of the displayed content, or detecting the user's gesture associated with the specific section of the displayed content. Detection of the user's eye movements or the user's gestures may be performed by a webcam or another visual sensor connected to the portable electronic device that also executes a corresponding sensor processing and detection software.

Figure 4:
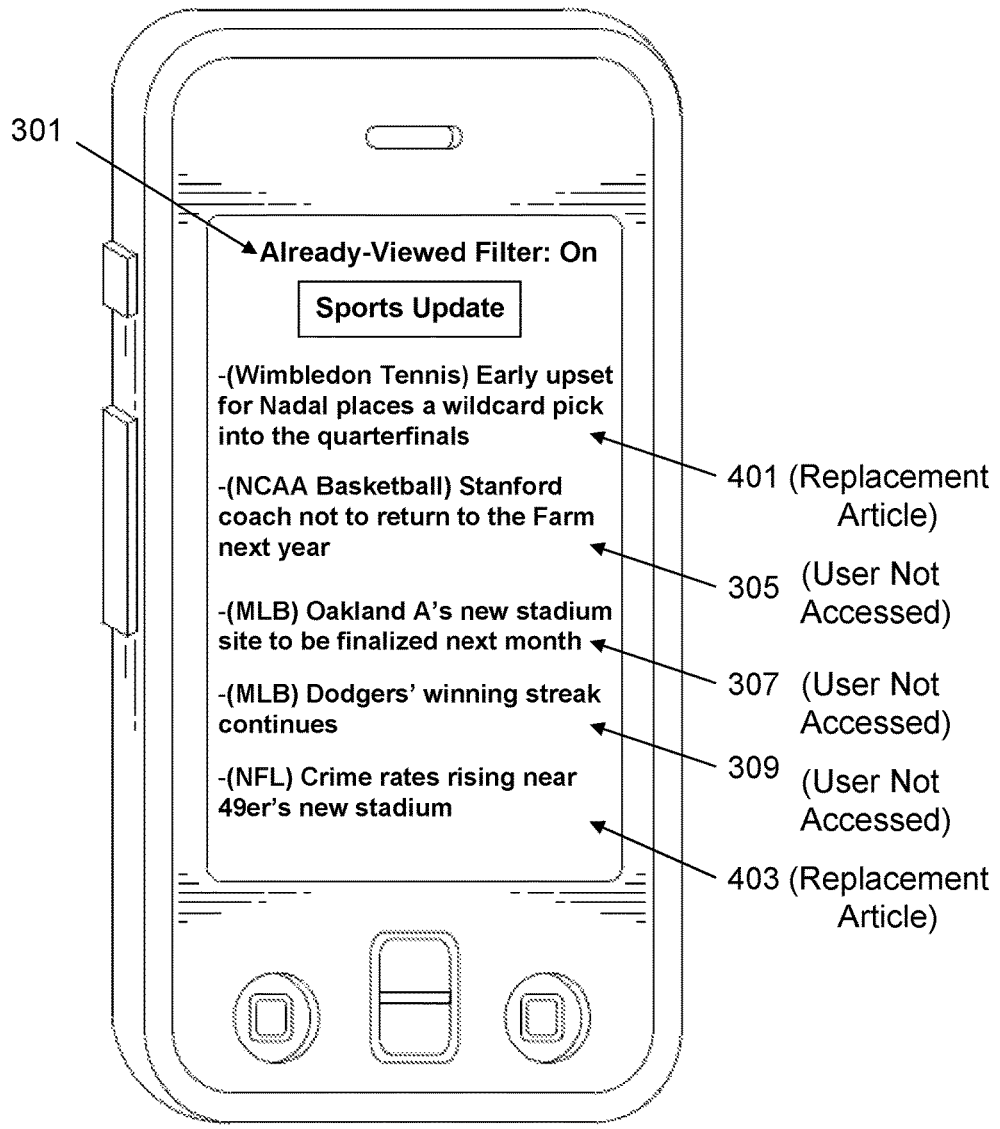
FIG. 4 shows a screenshot of a previously-browsed information adaptive filter unit integrated into a mobile device-based web browser or a mobile application, with the adaptive filter unit in an enabled mode with a preset time limit, in accordance with an embodiment of the invention.

FIG. 4 shows a screenshot (400) of a previously-browsed information adaptive filter unit integrated into a mobile device-based web browser or a mobile application, with the adaptive filter unit in an enabled mode with a preset time limit, in accordance with an embodiment of the invention. In the embodiment of the invention as shown in FIG. 4, the previously-browsed information adaptive filter unit may be activated with the preset time limit, so that previously-browsed information filtering is only operational for the duration of the preset time limit.

For a portable electronic device, when the previously-browsed information adaptive filter unit is in the enabled mode, previously reviewed, accessed, and interacted information by a particular user of the mobile web browser or the mobile application is automatically removed from the displayed information, as shown in the screenshot (400) in FIG. 4. Furthermore, the removed previously-browsed information is then substituted by new or fresh contents that have not been previously browsed by the user through the mobile web browser interface or the mobile application. The dynamic removal of previously-browsed information (e.g. 303, 311 of FIG. 3) and replacement with new or fresh contents (e.g. 401, 403 of FIG. 4) in specific areas of the displayed information is shown in the screenshot (400) of FIG. 4. This dynamic content removal and content substitution process involves synthesizing a personalized custom mobile user webpage view that only includes fresh, new, or previously un-browsed contents by a particular user, who is recognized and tracked by the previously-browsed information adaptive filter unit.

When the previously-browsed information adaptive filter unit is in the enabled mode, previously-browsed information (e.g. 303, 311 of FIG. 3) by a particular user is removed (i.e. filtered out) and is replaced or substituted by "user un-browsed" new contents that are freshly downloaded and synthesized into the personalized custom mobile user webpage view, as shown the screenshot (400) of FIG. 4. In this example, the "Wimbledon Tennis" news flash hyperlink (401) and the "NFL" news flash hyperlink (403) are "user un-browsed" new sports update contents that are freshly downloaded from the website currently being visited by the particular user through the mobile browser interface. The "user un-browsed" new contents (e.g. 401, 403 of FIG. 4) automatically replace and substitute for the previously-browsed information (e.g. 303, 311 of FIG. 3) to synthesize the personalized custom webpage view, as shown by the screenshot (400) in FIG. 4, if the previously-browsed information adaptive filter unit is in the enabled mode.

Furthermore, as shown in the screenshot (400) of FIG. 4, previously or repeatedly-downloaded electronic information that have not been previously-browsed by the user (e.g. 305, 307, 309 of FIG. 3 and FIG. 4) are not replaced in the personalized custom mobile user webpage view, and are instead packaged together with the "user un-browsed" new contents (e.g. 401, 403 of FIG. 4) that automatically replaced and substituted for the previously-browsed information (e.g. 303, 311 of FIG. 3), when the previously-browsed information adaptive filter unit is in the enabled mode.

In one embodiment, the screenshot (400) in FIG. 4 is a snapshot of a mobile webpage visited by the user through the mobile web browser. In another embodiment, the screenshot (400) may be a snapshot of a user interface of a mobile application that connects to an online content provider's computer server. Textual information displayed by the mobile web browser or the mobile application may include, but are not limited to, news articles, hyperlinks to a webpage, text messages, and emails. Multimedia information displayed by the mobile web browser or the mobile application may include, but are not limited to, videos, podcasts, web broadcasts, audio broadcasts, or hyperlinks to such multimedia contents.

In context of the screenshot (400) of FIG. 4, the unique synthesis of the personalized custom mobile webpage view by infusing the "user un-browsed" new contents (e.g. 401, 403 of FIG. 4) with the previously or repeatedly-downloaded electronic information that have not been previously-browsed by the user (e.g. 305, 307, 309 of FIG. 3 and FIG. 4), in accordance with an embodiment of the invention, is a novel aspect of the invention that allows the user to read, review, inspect, or entertain only with fresh online contents in the mobile web browser interface or the mobile application, when and if the user chooses to activate the previously-browsed information adaptive filter unit.

In some situations, the novel feature of synthesizing and presenting only fresh and previously un-browsed electronic contents to the user provides significant advantages to the user and the mobile web browser interface operating in a portable electronic device. For example, when the user desires to only read, review, or interact with fresh (i.e. previously uninspected) mobile web or mobile app contents, the previously-browsed information adaptive filtering, in accordance with one or more embodiments of the invention, provides substantial convenience and efficiencies to the user by alleviating an otherwise-necessary mental task of sorting and separating old information from new information. Furthermore, the previously-browsed information adaptive filtering also empowers the user with less screen clutter and more screen space to experience fresher or newer information in the personalized custom mobile webpage view. In addition, activating the previously-browsed information adaptive filter unit can improve the display screen real estate utilization by presenting fresher or newer information only within the constraint of a limited display screen size and a limited display resolution, which are typical in a portable electronic device such as a smart phone or a tablet computing device.

FIG. 5 shows a settings menu (500) for a previously-browsed information adaptive filter unit, which is incorporated into a web browser, in accordance with an embodiment of the invention. As shown in FIG. 5, in this embodiment of the invention, the settings menu (500) may include user-selectable controls, such as a filter enable/disable switch, a timer on/off switch, and a timer duration adjustment interface. The user can choose to turn the previously-browsed information adaptive filter on or off via the filter enable/disable switch, and also choose to activate the filter timer or not. If the filter timer is activated, then the user can also select or adjust the timer duration (e.g. 48 hours), which ensures that the previously-browsed information adaptive filter automatically turns off after the user-adjusted timer duration has elapsed from the point of the initial activation of the previously-browsed information adaptive filter.

In another embodiment of the invention, the settings menu (500) may be part of a mobile application, an operating system control panel, or another computerized user interface, in addition to or instead of being part of the web browser. Furthermore, in another embodiment of the invention, the settings menu (500) may include only a subset of the three controls shown in FIG. 5. Alternatively, the settings menu (500) may include other user-selectable controls in addition to the three controls shown in FIG. 5.

Figure 6:
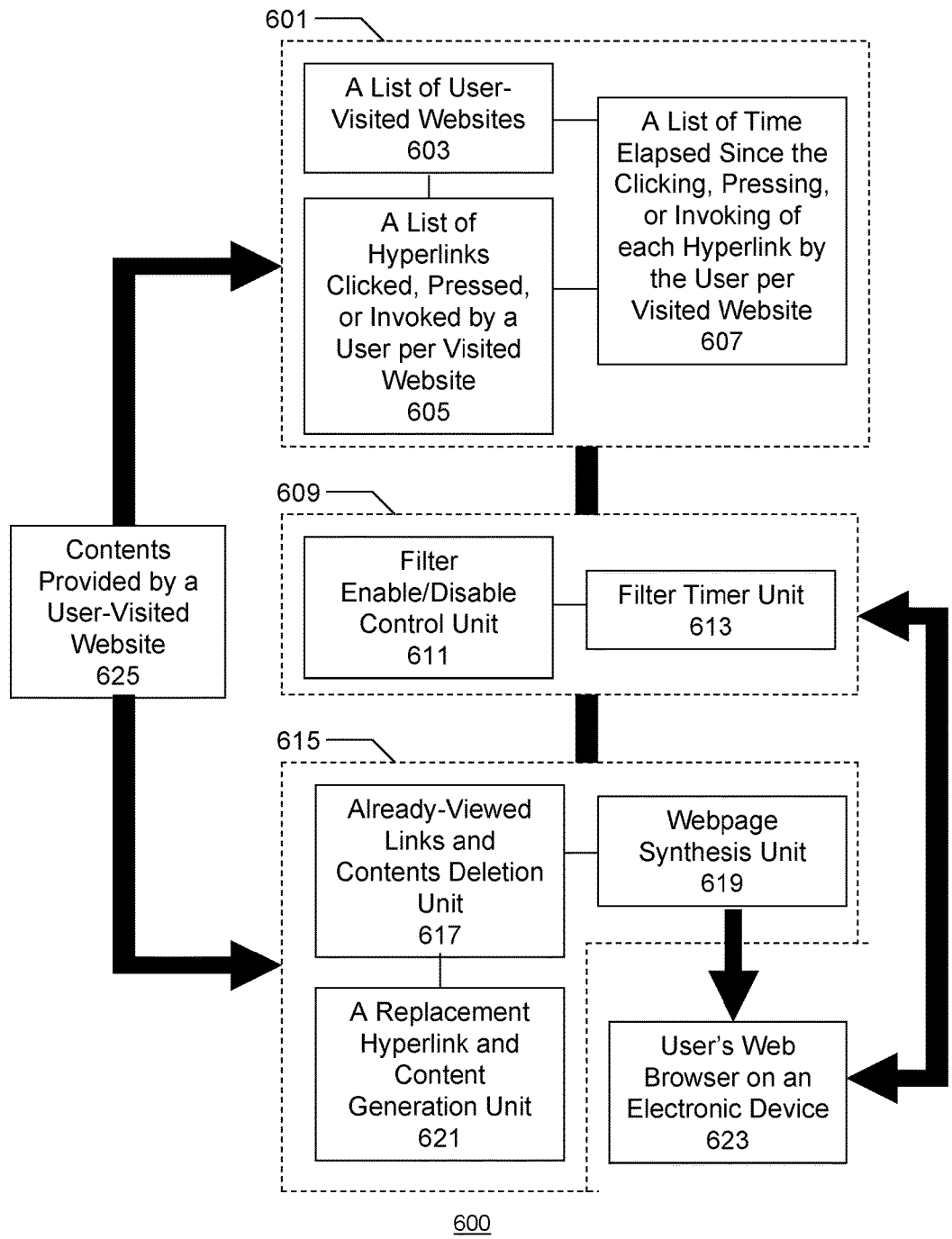
FIG. 6 shows an embodiment of logical units in a previously-browsed information adaptive filter unit, in accordance with an embodiment of the invention.

FIG. 6 shows an embodiment of logical units (600) in a previously-browsed information adaptive filter unit, in accordance with an embodiment of the invention. In this embodiment of the invention, the previously-browsed information adaptive filter unit may include a plurality of logical units (600) comprising an adaptive filter control and timer logic block (609), an adaptive filtering and content substitution logic block (615), and an adaptive filter's updatable database (601).

As shown in FIG. 6, the adaptive filter control and timer logic block (609) comprises a filter timer unit (613) and a filter enable/disable control unit (611). Furthermore, the adaptive filtering and content substitution logic block (615) comprises an already-viewed links and contents deletion unit (617), a replacement hyperlink and content generation unit (621), and a webpage synthesis unit (619). In a preferred embodiment, the adaptive filtering and content substitution logic block (615) is operatively connected to a website's computer server (625) that provides electronic contents to the user's web browser on an electronic device (623). The electronic device may be a desktop computer, a laptop computer, a tablet computer, a smart phone, an electronic goggle, or another electronically-computing device that operates the web browser.

Continuing with FIG. 6, the adaptive filter's updatable database (601) comprises a list of user-visited websites (603), a list of hyperlinks clicked, pressed, or invoked by the user per visited website (605), and a list of time elapsed since clicking, pressing, or invoking of each hyperlink by the user per visited website (607). Furthermore, the adaptive filter's updatable database (601) is also operatively connected to the website's computer server (625) to dynamically track and update the list of user-visited websites and the list of hyperlinks clicked, pressed, or invoked by the user accessing the website.

In the embodiment of the logical units (600) in the previously-browsed information adaptive filter unit as shown in FIG. 6, the already-viewed links and contents deletion unit (617) is capable of identifying and removing one or more already-viewed links and contents by comparing an incoming flow of digitized information contents from the website's computer server with the list of user-visited websites and the list of hyperlinks clicked, pressed, or invoked by the user, as stored in the adaptive filter updatable database. Examples of digitized information contents, also interchangeably referred herein as "electronic contents," include news articles, texts, multimedia contents (i.e. audio, video, animations, etc.), and embedded worldwide web hyperlinks.

Furthermore, the replacement hyperlink and content generation unit (621) in the adaptive filtering and content substitution logic block (615) is configured to request different digitized information from the website's computer server to replace and substitute the already-viewed links and contents with the different digitized information to make viewable contents on the web browser free of the already-viewed links and contents.

Moreover, the webpage synthesis unit (619) in the adaptive filtering and content substitution logic block (615) is configured to create a unique webpage for display on the web browser of the computerized electronic device. Preferably, the unique webpage is capable of infusing the different digitized information, which are newly-received from the website's computer server as the incoming flow of digitized contents that are free of the already-viewed links and contents after being processed by the replacement hyperlink and content generation unit (621).

Continuing with FIG. 6, the filter enable/disable control unit (611) in the adaptive filter control and timer logic block (609) is configured to activate or deactivate the previously-browsed information adaptive filter, based on a user command received from the computerized electronic device. Furthermore, the filter timer unit (613) in the adaptive filter control and timer logic block (609) sets a timer duration for keeping the previously-browsed information adaptive filter unit in an enabled (i.e. active) mode. Preferably, the filter timer unit (613) is controlled via a user command received from the computerized electronic device. In addition, the adaptive filter control and timer logic block (609) may be configured to generate a settings menu (e.g. 500 in FIG. 5) on a display screen of the computerized electronic device to allow the user to control the filter timer unit (613) and the filter enable and disable control unit (611).

Moreover, in a preferred embodiment of the invention, the adaptive filter's updatable database (601) is locally stored and managed by the computerized electronic device. In an alternate embodiment of the invention, the adaptive filter's updatable database (601) can also be remotely stored and managed by a cloud computer server or another remotely-connected computer system.

Figure 7:
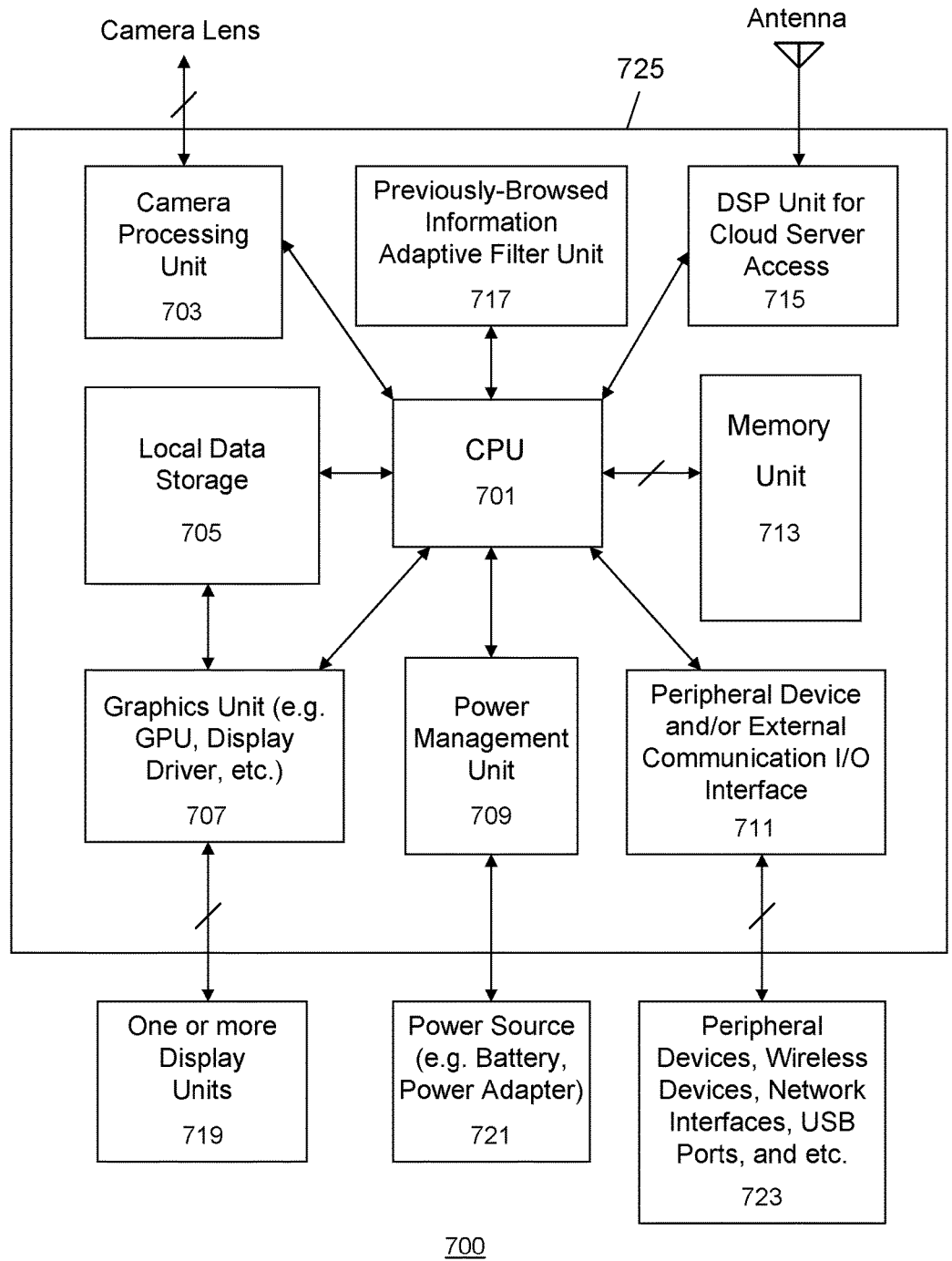
FIG. 7 shows an example of a computerized electronic device incorporating a previously-browsed information adaptive filter unit, in accordance with an embodiment of the invention.

FIG. 7 shows a system block diagram example (700) of a computerized electronic device that incorporates a previously-browsed information adaptive filter unit (717), in accordance with an embodiment of the invention. The computerized electronic device may be a desktop computer, a laptop computer, a tablet computer, a smart phone, an electronic goggle, or another electronically-computing device that operates a web browser.

In a preferred embodiment of the invention, the computerized electronic device is configured to provide web browsing and web browser-filtering capabilities. Furthermore, the computerized electronic device may also provide mobile application or other software application execution capabilities. As shown in the system block diagram example (700) of FIG. 7, the computerized electronic device has a CPU (701) which is operatively connected to a memory unit (713), a local data storage (705), a camera processing unit (703), a graphics unit (707) (e.g. a graphics processor, a display driver, and etc.), a power management unit (709), a peripheral device and/or external communication I/O interface (711), a digital signal processing (DSP) unit for cloud server access (715), a previously-browsed information adaptive filter unit (717), and a sound unit. These logical units may be placed on a single printed circuit board (725) in one embodiment of the invention, or a plurality of printed circuit boards in another embodiment of the invention.

In the preferred embodiment of the invention, the CPU (701) is configured to control each logical unit operatively (i.e. directly or indirectly) connected to the CPU (701). The memory unit (713) typically comprises volatile memory banks based on DRAM's. In some embodiments of the invention, the memory unit (713) may use non-volatile memory technologies such as SRAM's and/or Flash memory. The memory unit (713) is capable of storing programs and applications which can be executed by the CPU (701), the graphics unit (707), or another logical unit operatively connected to the memory unit (713). In particular, in the preferred embodiment of the invention, instructions, datasets, and codes originating from the previously-browsed information adaptive filter unit (717) can be executed on the CPU (701) and the memory unit (713) of the computerized electronic device to provide adaptive information filtering for the web browser or one or more mobile applications. The previously-browsed information adaptive filter unit (717) may be a separate standalone logical unit, as shown in FIG. 7, or a collection of software or machine codes associated with the previously-browsed information adaptive filter stored in the local data storage (705). Preferably, the previously-browsed information adaptive filter unit (717) contains one or more logical units (e.g. 601, 609, 615) previously described in FIG. 6.

Continuing with FIG. 7, any software and programs executed on the CPU (701) and the memory unit (713) of the computerized electronic device may be part of an operating system, or a separate application installed on the operating system of the computerized electronic device. Furthermore, the camera processing unit (703) is operatively connected to a camera lens on the computerized electronic device, and is able to process image-related data from the camera lens in association with the CPU (701) and/or other logical units in the computerized electronic device to produce live recorded video information, which may be stored in the local data storage (705). In addition, a microphone operatively connected to the sound unit can produce live recorded audio information, which can also be stored in the local data storage (705).

Moreover, as shown in FIG. 7, the digital signal processing (DSP) unit for cloud server access (715) is operatively connected to an radio frequency (RF) antenna. The DSP unit for cloud server access (715) is generally configured to receive and transmit radio data and/or voice signals wirelessly for a desktop computer, a laptop, a mobile communication device, an electronic goggle, or another suitable electronic system. In addition, the power management unit (709) is operatively connected to a power supply unit and a power source (e.g. battery, power adapter) (721), and the power management unit (709) generally controls power supplied to the computerized electronic device and its logical units. Moreover, the peripheral device and/or external communication I/O interface (711) as shown in FIG. 7 can be operatively connected to one or more peripheral devices, wireless devices, USB ports, and other external data communication media (723).

Continuing with FIG. 7, in the preferred embodiment of the invention, the graphics unit (707) in the system block diagram example (700) for the computerized electronic device comprises a graphics processor, a display driver, a dedicated graphics memory unit, and/or another graphics-related logical components. In general, the graphics unit (707) is able to process and communicate graphics-related data with the CPU (701), the display driver, and/or the dedicated graphics memory unit. The graphics unit (707) is also operatively connected to one or more display units (719). In addition, the CPU (701) may be operatively connected to the sound unit which contains audio-related logical components for generation or recording of audio data from a microphone operatively connected to the computerized electronic device.

Figure 8:
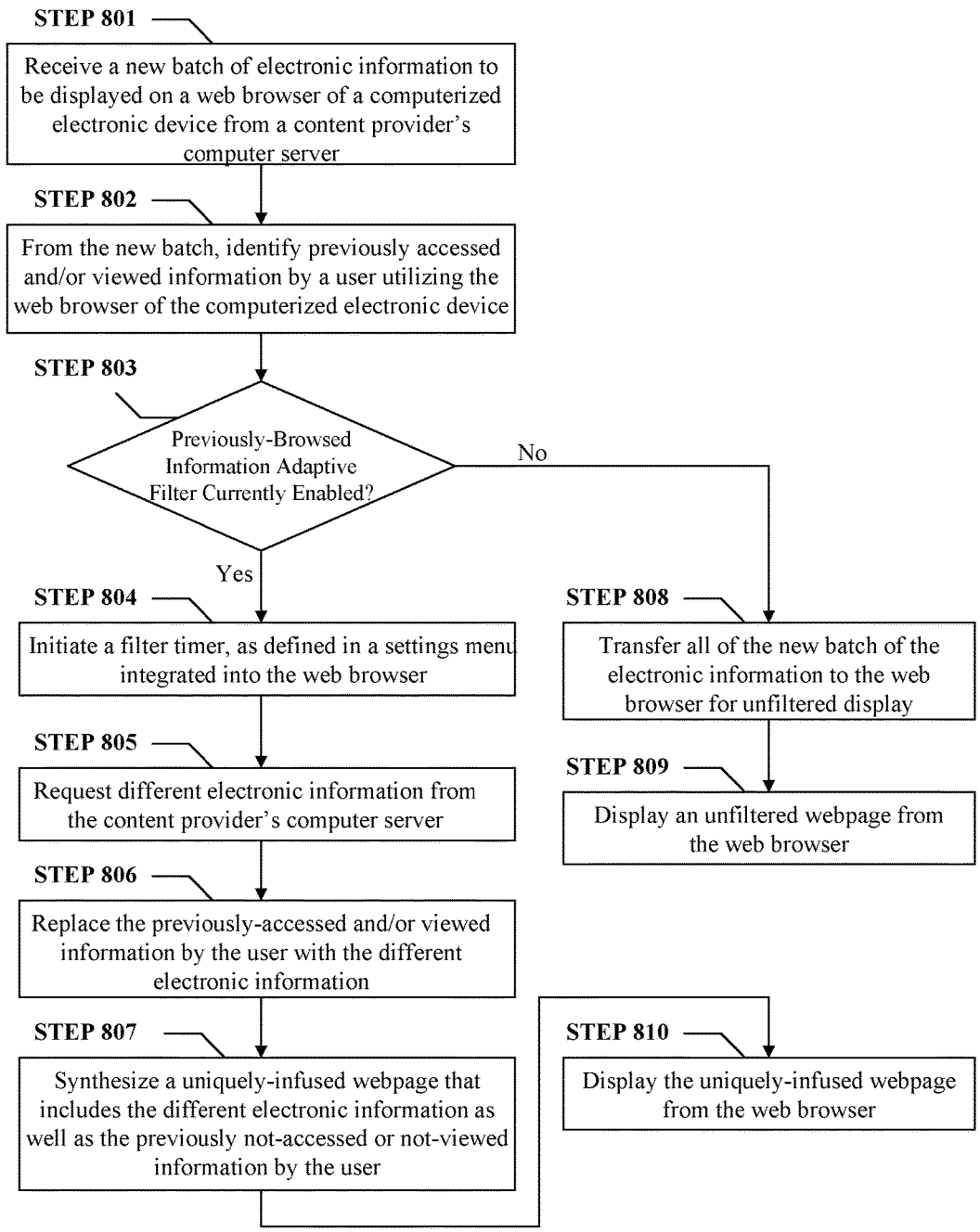
FIG. 8 shows a method of operating a previously-browsed information adaptive filter unit for improvement in functioning of a computerized electronic device, in accordance with an embodiment of the invention.

FIG. 8 shows a method (800) of operating a previously-browsed information adaptive filter unit for improvement in functioning of a computerized electronic device, in accordance with an embodiment of the invention. In this embodiment, the computerized electronic device receives a new batch of electronic information from a content provider's computer server, wherein the new batch of electronic information are configured to be displayed on a web browser, as shown in STEP 801. The previously-browsed information adaptive filter unit of the computerized electronic device then identifies previously-accessed and/or viewed information by a user utilizing the web browser executed on the computerized electronic device, as shown in STEP 802.

If the previously-browsed information filter unit is currently enabled, then the previously-browsed information adaptive filter unit initiates a filter timer, as defined in a settings menu interface which is integrated into the web browser, as shown in STEP 803 and STEP 804. Then, the previously-browsed information adaptive filter unit requests "different electronic information" from the content provider's computer server, as shown in STEP 805. Once the content provider's computer server transmits the different electronic information, the previously-browsed information adaptive filter unit replaces the previously-accessed and/or viewed information by the user with the different electronic information, as shown in STEP 806. Subsequently, the previously-browsed information adaptive filter unit can synthesize a uniquely-infused webpage that includes the different electronic information as well as the previously not-accessed or not-viewed information by the user, as shown in STEP 807. Lastly, the previously-browsed information adaptive filter unit can display the uniquely-infused webpage from the web browser, as shown in STEP 810.

On the other hand, if the previously-browsed information adaptive filter unit is not currently enabled, as determined by STEP 803, then the web browser can simply transfer all of the new batch of the electronic information to the web browser for unfiltered display, as shown in STEP 808. Then, an unfiltered webpage from the web browser can be displayed, as shown in STEP 809.

The present invention, as described in several embodiments above, provides several advantages over conventional web browsers and other means of electronic information review by a user of a computerized electronic device. For example, when the user desires to only read, review, or interact with fresh (i.e. previously uninspected) web or mobile app contents, the previously-browsed information adaptive filtering provides substantial convenience and efficiencies to the user by alleviating an otherwise-necessary mental task of sorting and separating old information from new information. Furthermore, the previously-browsed information adaptive filtering also empowers the user with less screen clutter and more screen space to experience fresher or newer information in the personalized custom webpage view. In addition, activating the previously-browsed information adaptive filter unit can improve the display screen real estate utilization by presenting fresher or newer information only within the constraint of a limited display screen size and a limited display resolution, which are typical in a portable electronic device such as a smart phone or a tablet computing device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A previously-browsed information adaptive filter unit integrated into a web browser that improves functioning of a computerized electronic device by maximizing display screen real estate utilization and user review speed of the web browser operated by the computerized electronic device, the previously-browsed information adaptive filter unit comprising:
   an adaptive filter control and timer logic block comprising a filter timer unit and a filter enable and disable control unit, wherein the adaptive filter control and timer logic block activates or deactivates a maximum display screen real estate utilization and user review speed mode for the web browser incorporated into the computerized electronic device;
   an adaptive filtering and content substitution logic block that improves the functioning of the computerized device by maximizing display screen real estate utilization and user review speed of the web browser operated by the computerized electronic device, wherein the adaptive filtering and content substitution logic block comprises an already-viewed links and contents deletion unit, a replacement hyperlink and content generation unit, and a webpage synthesis unit, and wherein the adaptive filtering and content substitution logic block is operatively connected to a website's computer server that provides electronic contents to the web browser of the computerized electronic device via a data network; and
   an adaptive filter's updatable database comprising a list of user-visited websites, a list of hyperlinks clicked, pressed, or invoked by a user accessing the website, and a list of time elapsed since clicking, pressing, or invoking of each hyperlink by the user accessing the website through the computerized electronic device connected to the website's computer server, wherein the adaptive filter's updatable database is also operatively connected to the website's computer server to dynamically track and update the list of user-visited websites and the list of hyperlinks clicked, pressed, or invoked by the user accessing the website.

2. The previously-browsed information adaptive filter unit of claim 1, wherein the already-viewed links and contents deletion unit identifies and removes one or more already-viewed links and contents by comparing an incoming flow of electronic contents from the website's computer server with the list of user-visited websites and the list of hyperlinks clicked, pressed, or invoked by the user, as stored in the adaptive filter updatable database.

3. The previously-browsed information adaptive filter unit of claim 2, wherein the replacement hyperlink and content generation unit requests different electronic information from the website's computer server to replace and substitute the one or more already-viewed links and contents embedded in the incoming flow of electronic contents with the different electronic information to make viewable contents on the web browser free of the one or more already-viewed links and contents.

4. The previously-browsed information adaptive filter unit of claim 3, wherein the webpage synthesis unit creates a unique webpage for display on the web browser of the computerized electronic device, wherein the unique webpage infuses the different electronic information newly-received from the website's computer server with the incoming flow of electronic contents, which are free of the one or more already-viewed links and contents after being processed by the replacement hyperlink and content generation unit.

5. The previously-browsed information adaptive filter unit of claim 1, wherein the filter enable and disable control unit enables or disables the previously-browsed information adaptive filter based on a user command received from the computerized electronic device.

6. The previously-browsed information adaptive filter unit of claim 1, wherein the filter timer unit sets a timer duration for keeping the previously-browsed information adaptive filter unit in an enabled mode, and wherein the timer duration is controllable via a user command received from the computerized electronic device.

7. The previously-browsed information adaptive filter unit of claim 1, wherein the adaptive filter's updatable database is locally stored and managed by the computerized electronic device.

8. The previously-browsed information adaptive filter unit of claim 1, wherein the electronic contents transmitted by the website's computer server to the web browser of the computerized electronic device are at least one of news articles, texts, multimedia contents, and embedded world-wide web hyperlinks.

9. The previously-browsed information adaptive filter unit of claim 1, wherein the computerized electronic device is a desktop computer, a laptop computer, a tablet computer, a smart phone, or another electronically-computing device that operates the web browser.

10. The previously-browsed information adaptive filter unit of claim 1, wherein the adaptive filter control and timer logic block generates a settings menu on a display screen of the computerized electronic device to enable the user to control the filter timer unit and the filter enable and disable control unit.

11. A method for operating a previously-browsed information adaptive filter integrated into a web browser that improves functioning of a computerized electronic device by maximizing display screen real estate utilization and user review speed of the web browser in the computerized electronic device, the method comprising the steps of:
   receiving a batch of electronic information to be displayed on the web browser of a computerized electronic device from a website's computer server;
   identifying previously-accessed or previously-reviewed information by a user from the batch of electronic information;
   checking whether the previously-browsed information adaptive filter is currently in an enable mode to maximize the display screen real estate utilization and the user review speed of the web browser incorporated in the computerized electronic device;
   if the previously-browsed information adaptive filter is in the enable mode:
      initiating a filter timer, which is controlled and managed by a settings menu integrated into the web browser;
      requesting different electronic information from the website's computer server;
      replacing the previously-accessed or previously-reviewed information with the different electronic information to remove content redundancy and supply fresh information instead to maximize the display screen real estate utilization and the user review speed of the web browser incorporated in the computerized electronic device;

synthesizing a uniquely-infused webpage that includes the different electronic information and a non-accessed and non-reviewed portion of the batch of electronic information to remove content redundancy and supply fresh information instead to maximize the display screen real estate utilization and the user review speed of the web browser incorporated in the computerized electronic device; and displaying the uniquely-infused webpage from the web browser;

else if the previously-browsed information adaptive filter is in a disable mode:

transferring all of the batch of electronic information to the web browser for unfiltered display; and displaying an unfiltered webpage from the web browser.

12. The method of claim 11, wherein the computerized electronic device is a desktop computer, a laptop computer, a tablet computer, a smart phone, or another electronically-computing device that operates the web browser.

13. The method of claim 11, wherein the batch of electronic information and the different electronic information from the website's computer server are at least one of news articles, texts, multimedia contents, and embedded worldwide web hyperlinks.

14. The method of claim 11, wherein the enable mode and the disable mode are controlled by the settings menu integrated into the web browser.

* * * * *